United States Patent [19]
Kim

[11] Patent Number: 5,870,055
[45] Date of Patent: Feb. 9, 1999

[54] TRACKING RADAR SIGNAL GENERATOR

[75] Inventor: Kyoung-soo Kim, Suwon, Rep. of Korea

[73] Assignee: SamSung Electronics Co., Ltd., Kyungki-do, Rep. of Korea

[21] Appl. No.: 902,129

[22] Filed: Jul. 30, 1997

[30]     Foreign Application Priority Data

Jul. 30, 1996 [KR]  Rep. of Korea .................. 1996 31534

[51] Int. Cl.⁶ ....................................................... G01S 7/40
[52] U.S. Cl. ............................................................ 342/169
[58] Field of Search ................................... 342/169, 168, 342/165

[56]              References Cited

U.S. PATENT DOCUMENTS

| | | |
|---|---|---|
| 3,169,244 | 2/1965 | Scribner et al. . |
| 3,323,123 | 5/1967 | Hegrty et al. . |
| 3,641,574 | 2/1972 | Douglas . |
| 3,903,521 | 9/1975 | Jensen et al. . |
| 4,168,502 | 9/1979 | Susie . |
| 4,195,300 | 3/1980 | Gouley . |
| 4,591,858 | 5/1986 | Jacobson ................................. 342/169 |
| 4,644,357 | 2/1987 | Schaaf et al. ............................ 342/169 |
| 4,860,015 | 8/1989 | Hose ........................................ 342/169 |
| 4,982,196 | 1/1991 | Thomas et al. .......................... 342/169 |
| 5,223,840 | 6/1993 | Cronyn ..................................... 342/170 |
| 5,457,463 | 10/1995 | Vencel et al. ............................ 342/169 |

*Primary Examiner*—Daniel T. Pihulic
*Attorney, Agent, or Firm*—Robert E. Bushnell, Esq.

[57]             ABSTRACT

A tracking radar signal generator enables the development of a tracking algorithm of the radar controller even before the tracking is completely developed. In the signal generator, a time data generator receives a master clock signal for synchronizing the tracking radar signal generator, a pulse repetition frequency (PRF) signal for generating a sync signal in a radar signal, a tracking target distance value which corresponds to a distance to a target being tracked, and a general target distance value which corresponds to a distance of a target which is only input without being tracked, calculates a tracking target signal and a general target signal which are time-dimension values of the tracking target distance value and the general target distance value, respectively, and outputs the respective input signals including the tracking target signal and the general target signal. A noise generator generates a noise signal in real time. A sync signal generator generates an analog sync signal by amplifying the signal output from the channel of the PRF signal and generates a sync signal for the time data generator. A video signal generator generates and outputs a video signal by combining the noise signal from the noise generator and the tracking target signal and the general target signal from the time data generator.

7 Claims, 2 Drawing Sheets

TRACKING RADAR SIGNAL GENERATOR

CLAIM OF PRIORITY

This application makes reference to, incorporates the same herein, and claims all benefits accruing under 35 U.S.C. § 119 from an application for TRACKING RADAR SIGNAL GENERATOR earlier filed in the Korean Industrial Property Office on the 30$^{th}$ day of July 1996 and there duly assigned Ser. No. 31534/1996, a copy of which application is annexed hereto.

BACKGROUND OF THE INVENTION

1. Field of the Invention

The present invention relates to a radar signal generator, and more particularly, to a tracking radar signal generator which simulates a signal transmitted from a tracking radar to a radar controller.

2. Description of the Related Art

In a typical radar system, a radar controller receives target data from a tracking radar and processes and displays the received data. In the development of the radar controller, the target data from the tracking radar is required to adapt the system to the environment. Therefore, it is difficult to develop or test a tracking algorithm of the radar controller if the tracking radar is not developed. Furthermore, to develop a more accurate tracking algorithm of the radar controller, various possible environments should be assumed and then the tracking algorithm of the radar controller should be developed and verified with respect to the target under each environment.

The following patents each disclose features in common with the present invention but do not teach or suggest the specifics of the tracking radar signal generator of the present invention: U.S. Pat. No. 4,982,196 to Thomas et al., entitled *Radar Target Simulator*, U.S. Pat. No. 5,223,840 to Cronyn, entitled *Low Cost Radar Target Simulator For Remote Radar Testing*, U.S. Pat. No. 3,169,244 to Scribner et al., entitled *Moving Target Simulator*, U.S. Pat. No. 3,323,123 to Hegarty et al., entitled *Range Simulator For Providing A Controlled Delay Between An Input Trigger And An Output Pulse*, U.S. Pat. No. 3,641,574 to Douglas, entitled *Radar Rangemark Calibrator*, U.S. Pat. No. 4,168,502 to Susie, entitled *Digitally Controlled Signal Simulator*, U.S. Pat. No. 4,195,300 to Gouley, entitled *Device For Simulating The Locating Signals Of An ILS Beacon*, U.S. Pat. No. 4,644,357 to Schaaf et al., entitled *Radar Clutter Simulator*, U.S. Pat. No. 5,457,463 to Vencel et al., entitled *Radar Return Signal Simulator*, and U.S. Pat. No. 3,903,521 to Jensen et al., entitled *Simulator Of Radar Return Signals From An Accelerating Target*.

SUMMARY OF THE INVENTION

To solve the above problem, the object of the present invention is to provide a tracking radar signal generator which enables the development of a tracking algorithm and the testing of the operation of the radar controller before a tracking radar is completely developed.

In order to achieve the above object, a tracking radar signal generator according to the present invention comprises a time data generator for receiving a master clock signal for synchronizing the tracking radar signal generator, a pulse repetition frequency (PRF) signal for generating a sync signal in a radar signal, a tracking target distance value which corresponds to a distance to a target being tracked, and a general target distance which is a distance value to a target which corresponds to only input without being tracked, and for calculating a tracking target signal and a general target signal which are time-dimension values of the tracking target distance value and the general target distance value, respectively, and for outputting the respective input signals including the tracking target signal and the general target signal; a noise generator for generating a noise signal in real time; a sync signal generator for generating an analog sync signal by amplifying the signal output from the channel of the PRF signal and generating a sync signal for the time data generator; and a video signal generator for generating and outputting a video signal by combining the noise signal from the noise generator and the tracking target signal and the general target signal from the time data generator.

Preferably, the noise generator comprises a random data table for storing random data and outputting the same in real-time; and an operational amplifier for amplifying the random data from the random data table.

Preferably, the sync signal generator comprises a first invertor for inverting the signal output from the time data generator and feeding back the inverted signal to the time data generator; a second invertor for inverting the output signal of the first invertor; and an operational amplifier for amplifying the output signal of the second invertor to output the amplified signal as an analog sync signal.

Preferably, the video signal generator comprises a first operational amplifier for amplifying the tracking target signal output by the time data generator; an invertor for inverting the general target signal output by the time data generator; a second operational amplifier for amplifying the output signal of the invertor; and an analog adder for outputting a video signal by adding the output signals of the first and second operational amplifiers and the output signal of the operational amplifier of the noise generator.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
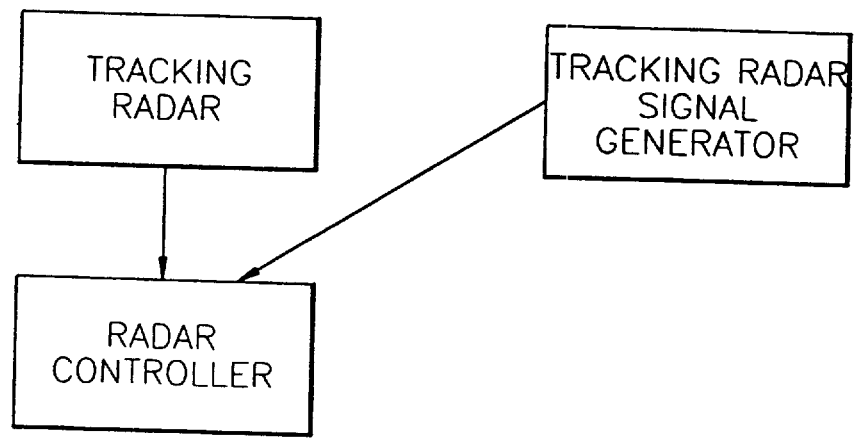
FIG. 1 is illustrates a structural relationship between a tracking radar, a radar controller and a radar signal generator of the present invention.

In FIG. 1, signals from a tracking radar are transmitted to a radar controller as indicated by an arrow. A tracking radar signal generator according to the present invention is used instead of the tracking radar to test the radar controller.

The signals transmitted from the tracking radar to the radar controller are composed of an analog sync signal and a video signal. Accordingly, the major functional elements of the tracking radar signal generator according to the present invention include a sync signal generator for generating a sync signal by receiving data input by a user and a video signal generator for generating a video signal.

Figure 2:
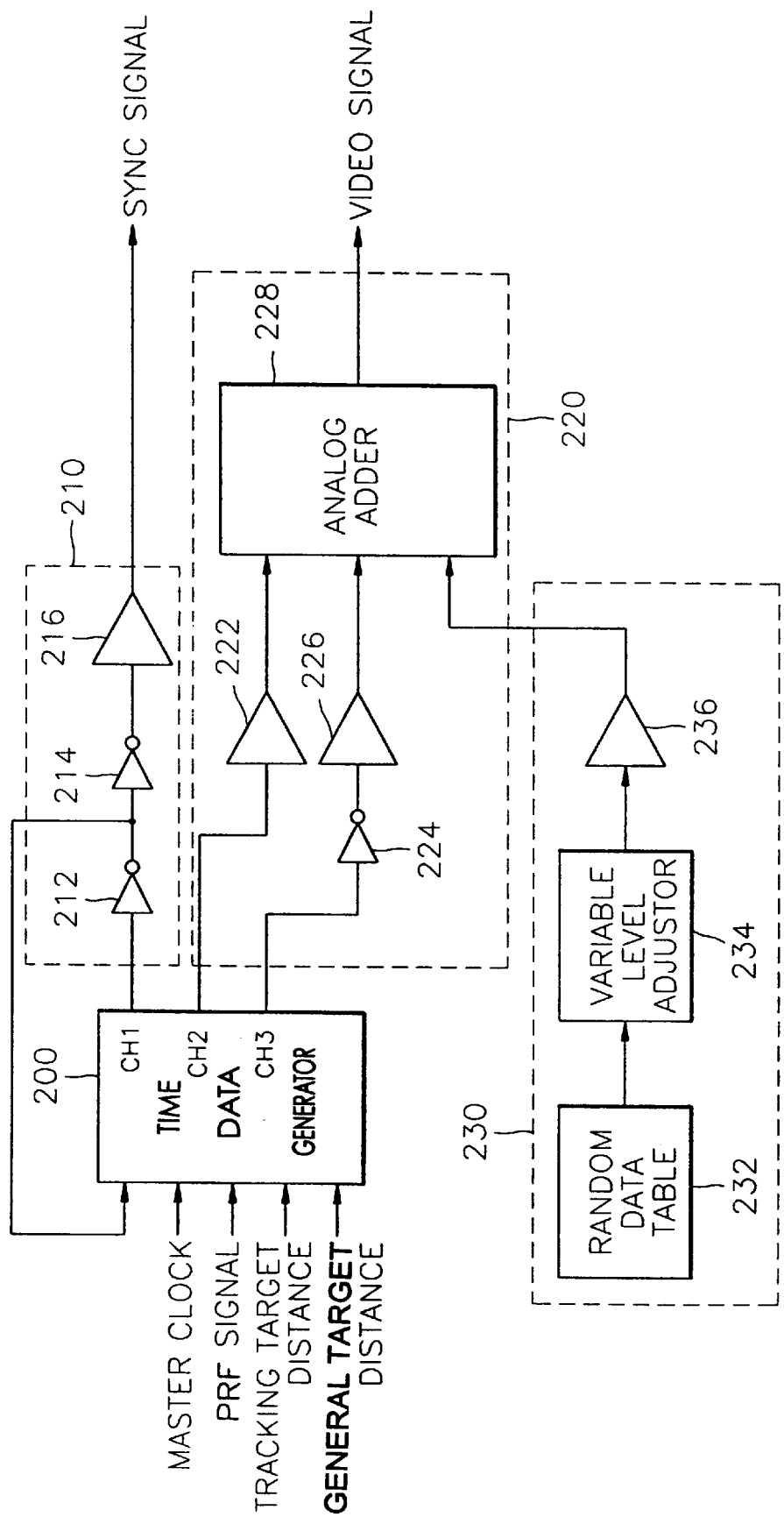
FIG. 2 is a block diagram of an embodiment a tracking radar signal generator according to of the present invention.

In FIG. 2, an embodiment of the tracking radar signal generator includes a time data generator 200, a sync signal generator 210, a video signal generator 220 and a noise generator 230.

The time data generator 200 receives a master clock signal which synchronizes all the elements of the tracking radar signal generator, a pulse repetition frequency (PRF) signal for generating a sync signal, a tracking target distance which is the distance to a target being tracked and a general target distance which is a distance to a target which is not tracked but whose signals are just input. Then, the time data generator 200 calculates a tracking target signal and a general target signal which are time dimension values of the tracking target distance and the general target distance, respectively, as follows.

Time (tracking or general target distance)=2×distance of Target/the speed of light Afterwards, the time data generator 200 outputs the respective input signals including the tracking target signal and the general target signal through channels CH1, CH2 and CH3.

The time data generator 200 may comprise a commercially available device, such as part No. NEC D8253C-2.

In the noise generator 230, a random data table 232, which is a look-up table, stores random data and outputs such random data in real-time. A variable level adjustor 234 receives the random data from the random data table 232, adjusts the level of the random data signal according to the environment under which the radar signal is simulated and the characteristics of the radar, and outputs the level adjusted signal. An operational amplifier 236 amplifies the level adjusted signal from the variable level adjustor 234.

A first invertor 212 of the sync signal generator 210 receives the signal from the channel CH1 of the time data generator 200 and inverts such a signal. The output signal of the first invertor 212 is fed back to the time data generator 200 to be used as a sync signal for the time data generator 200. Also, the output signal of the first invertor 212 is supplied to a second invertor 214 to be inverted. An operational amplifier 216 amplifies the output signal of the second invertor 214 and outputs it as an analog sync signal.

In the video signal generator 220, which synthesizes the tracking target signal and the general target signal from the time data generator 200 with the noise signal from the noise generator 230, a first operational amplifier 222 receives the tracking target signal from the time data generator 200 and amplifies such a signal. A third invertor 224 receives the general target signal output by the time data generator 200 and inverts such a signal. A second operational amplifier 226 amplifies the inverted general target signal from the third inverter 224. An analog adder 228 receives the signals output by the first and second operational amplifiers 222 and 226 and the signal output by the operational amplifier 236 of the noise generator 230, and adds such signals and outputs the added signal as a video signal.

The operation radar signal generator of the present invention having the above structure will now be described with reference to the attached drawings.

First the signal generator receives a master clock signal of a frequency beyond 20 MHZ, the PRF signal having a frequency depending on the type of a radar, and the tracking and general target distances as input signals, and generates the sync signal and the video signal which are required in the signal generator. The input signals may be received through a serial port or a VME bus.

Figure 3:
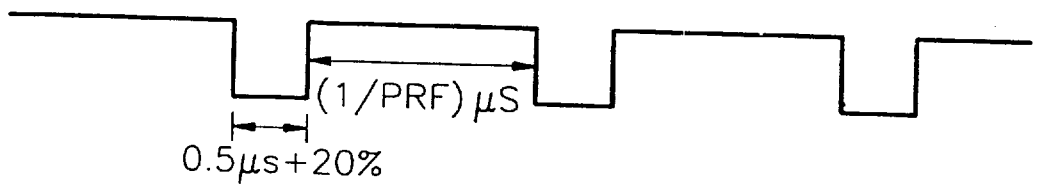
FIG. 3 shows a sync signal generated by the tracking radar signal generator of FIG. 2.

The sync signal is generated as follows. The signal generated according to the given PRF signal and output from the channel CH1 of the time data generator 200 is fed back to the time data generator 200 while being supplied to the first invertor 212. The signal inverted by the first invertor 212 is inverted again by the second invertor 214 and amplified by the operational amplifier 216 to be output as the analog sync signal. The waveform of the sync signal is illustrated in FIG. 3.

The video signal is generated by synthesizing the tracking and general target signals and the noise signal, and activated by the sync signal. The tracking target signal which is calculated in terms of time is output from the channel CH2 of the time data generator 200 and supplied to the analog adder 228 after being amplified by the first operational amplifier 222. The general target signal which is calculated in terms of time is output from the channel CH3 of the time data generator 200 and supplied to the analog adder 228 after being amplified by the second operational amplifier 226.

The noise signal is generated in real-time by use of the random number stored in the random data table 232. Since the noise level of noise signals differs depending on the environments in which the radar is assumed to be operated and the characteristics of the radar, the level of the random number is adjusted by the variable level adjuster 234 into a level appropriate for the environment and then amplified by the operational amplifier 236 and input to the analog adder 228.

Figure 4:
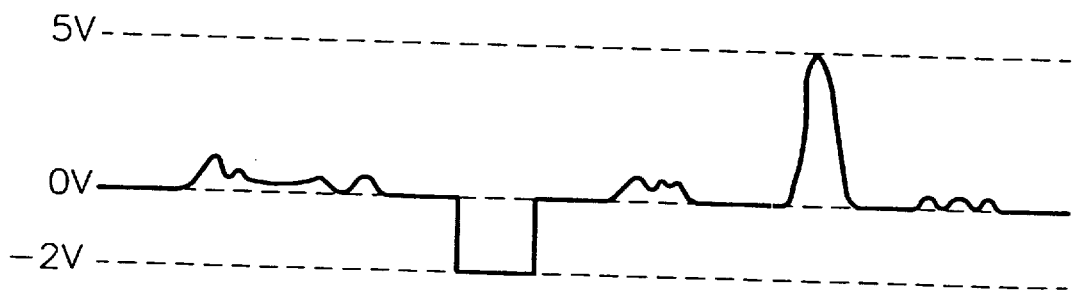
FIG. 4 shows video signals generated by the tracking radar signal generator of FIG. 2.

The analog adder 228 generates the video signal, which is illustrated in FIG. 4, by combining the tracking target signal, the general target signal and the noise signal.

As described above, according to the present invention, the time for developing radar can be reduced since it is possible to develop the tracking algorithm of the radar controller even before the tracking is completely developed. Also, the reliability of the radar controller can be improved by generating almost the same signal as an actual signal. Furthermore, various environments can be simulated by varying the noise level by using the variable level adjuster.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A tracking radar signal generator comprising:

a time data generator for receiving a master clock signal for synchronizing said tracking radar signal generator, a pulse repetition frequency (PRF) signal for generating a sync signal in a radar signal, a tracking target distance value which corresponds to a distance to a target being tracked, and a general target distance value which corresponds to a distance of a target which is only input without being tracked, and for calculating a tracking target signal and a general target signal which are time-dimension values of the tracking target distance value and the general target distance value, respectively, and for outputting the respective input signals including the tracking target signal and the general target signal;

a noise generator for generating a noise signal in real time;

a sync signal generator for generating an analog sync signal by amplifying the signal output from the channel of the PRF signal and generating a sync signal for said time data generator; and a video signal generator for generating and outputting a video signal by combining the noise signal from said noise generator and the tracking target signal and the general target signal from said time data generator.

2. A tracking radar signal generator as claimed in claim 1, said noise generator comprising:

a random data table for storing random data and outputting it in real-time; and an operational amplifier for amplifying the random data from said random data table.

3. A tracking radar signal generator as claimed in claim 2, further comprising a variable level adjustor for receiving the random data from said random data table, adjusting the signal level according to an environment under which the radar is assumed to be operated and the characteristics of the radar, and outputting a level-adjusted signal to said operational amplifier.

4. A tracking radar signal generator as claimed in claim 1, said sync signal generator comprising:

a first invertor for inverting the signal output from said time data generator and feeding back the inverted signal to said time data generator;

a second invertor for inverting the output signal of said first invertor; and an operational amplifier for amplifying the output signal of said second invertor and outputting the amplified signal as an analog sync signal.

5. A tracking radar signal generator as claimed in claim 3, said sync signal generator comprising:

a first invertor for inverting the signal output from said time data generator and feeding back the inverted signal to said time data generator;

a second invertor for inverting the output signal of said first invertor; and an operational amplifier for amplifying the output signal of said second invertor and outputting the amplified signal as an analog sync signal.

6. A tracking radar signal generator as claimed in claim 1, said video signal generator comprising:

a first operational amplifier for amplifying the tracking target signal output by said time data generator;

an invertor for inverting the general target signal output by said time data generator;

a second operational amplifier for amplifying the output signal of said invertor; and an analog adder for outputting a video signal by adding the output signals of said first and said second operational amplifiers and the output signal of said noise generator.

7. A tracking radar signal generator as claimed in claim 3, said video signal generator comprising:

a first operational amplifier for amplifying the tracking target signal output by said time data generator;

an invertor for inverting the general target signal output by said time data generator;

a second operational amplifier for amplifying the output signal of said invertor; and an analog adder for outputting a video signal by adding the output signals of said first and said second operational amplifiers and the output signal of said noise generator.

* * * * *